No. 861,381. PATENTED JULY 30, 1907.
A. T. MERRELL.
TOOL HOLDER.
APPLICATION FILED MAR. 20, 1906.

ATTEST
E. M. Fisher
F. B. Moser

INVENTOR
Arthur T. Merrell
By H. T. Fisher ATTY

UNITED STATES PATENT OFFICE.

ARTHUR T. MERRELL, OF CLEVELAND, OHIO.

TOOL-HOLDER.

No. 861,381.   Specification of Letters Patent.   Patented July 30, 1907.

Application filed March 20, 1906. Serial No. 307,048.

*To all whom it may concern:*

Be it known that I, ARTHUR T. MERRELL, a citizen of the United States, residing at Cleveland, in the county of Cuyahoga and State of Ohio, have invented certain new and useful Improvements in Tool-Holders, and do declare that the following is a full, clear, and exact description of the invention, which will enable others skilled in the art to which it appertains to make and use the same.
My invention relates to improvements in tool holders, and the improvement consists in a tool holder adapted to hold different sized tools and in the re-setting device combined therewith, substantially as shown and described and particularly pointed out in the claims.
My improved tool holder is especially adapted for threading tools which require repeated removals for regrinding the tool and where great accuracy in resetting the tool is necessary to properly complete the work. To meet these requirements, I provide a holder having an open sided adjustable clamping head adapted to removably seat the tool from the side or top of the holder and further provide the tool with a re-setting device which is adjustably mounted thereon and removable therewith and adapted to combine with the holder to bring the tool in the right relationship with the work when re-setting occurs.

Figure 1:
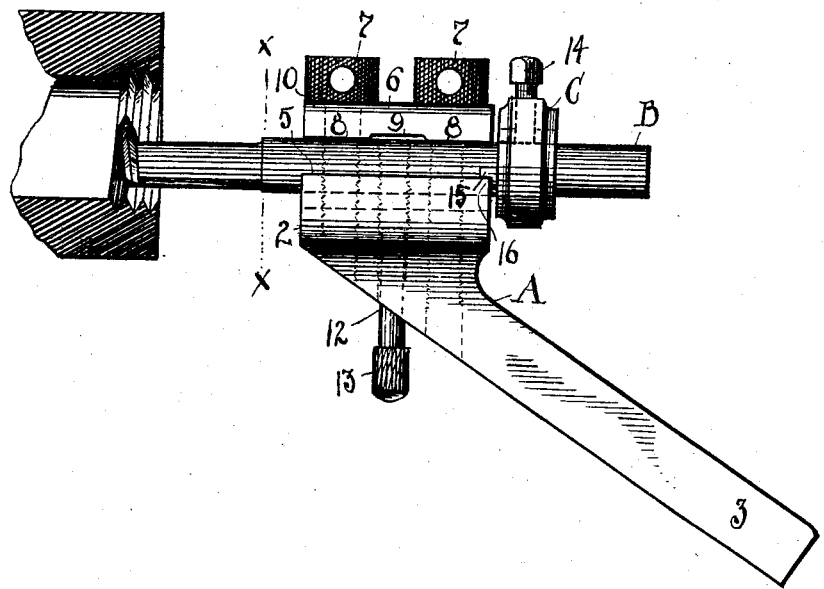
Figure 2:
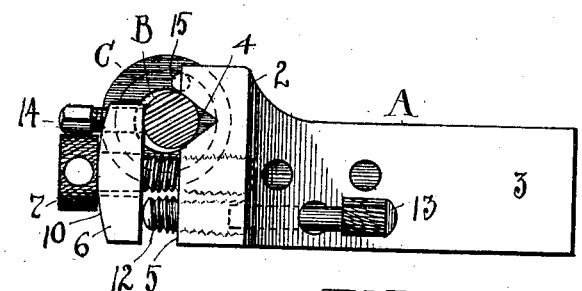
Figure 3:
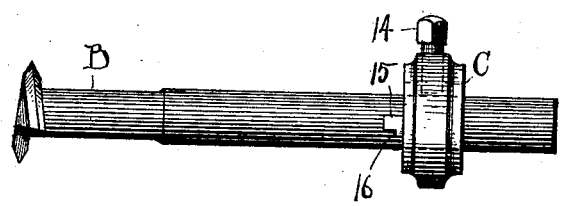

In the accompanying drawings Figure 1 is a plan view of my improved tool holder with the tool and re-setting device mounted therein as in operation. Fig. 2 is an end elevation of the tool holder on line $x$, $x$, Fig. 1. Fig. 3 is an elevation of the tool and the re-setting collar thereon.

The holder is designated by A and comprises clamp head 2 having a shank 3 projecting to one side thereof at an angle of substantially 45 degrees, and which shank is adapted to be secured within the tool support of a lathe. A V shaped groove or longitudinal seat 4 is formed within face 5 of head 2 for the shank of tool B, and said tool is held in place therein by adjustable clamping member 6 having a fulcrum rest against the end of screw 12 and adjustably secured upon head 2 by a pair of screws 7 threaded within head 2 and free to rotate within openings in member 6. A two point clamping face 8 is provided for member 6 opposite tool B by recessing said face centrally between its end as at 9, and outer face 10 of said member is curved from top to bottom so that the heads of screws 7 have a central engagement therewith even though member 6 may stand at a slight angle to vertical face 5. Screws 7 are located about midway between the bite of member 6 and the fulcrum bearing of screw 12, which is threaded through head 2 to form the rear and adapted to bear against the lower portion of the inner face of member 6 at a point centrally between its ends and below
the plane of screws 7. A head 13 serves as a finger
hold to rotate and set screw 12. Screws 7 and 12 taken
together provide means for alining clamp member 6 at
vrarying distances from groove 4 to accommodate different sized tools, and also wherewith the tool may be
firmly clamped in place between member 6 and head 2 as against rotation and endwise movement.

Clamp member 6 is of less height than head 2 and
when said parts are separated at their top there is
an open space between them approximately opposite
groove 4 through which tool B may be laterally removed or replaced. This lateral placement of the tool
enables one to use a re-setting device adapted to combine with the holder to accurately re-set the tool after
each removal for regrinding.

As shown, the re-setting device comprises a collar
C sleeved over the tool and adapted to be secured at any
point thereon by set screws 14, and the opening within
said collar is of sufficient size to take in various sized
shanks of tools. A pin or projection 15 is located at
one side of collar C and it engages face 5 of head 2 to set the cutting point of the tool on the center. Shoulder 16 on pin 15 abuts against the edge face of head 2
and fixes the position of tool B longitudinally within
holder A. When tool B is first placed in the holder and
collar C is secured upon the tool to set it in respect
thereto, the tool and collar are thereafter removable
together, and the tool may be accurately replaced
without question or delay. Shoulder 16 spaces collar
C apart from head 2 just enough to give clearance for
accumulations on their faces and affords a small contact which assures accurate setting.

What I claim is:—

1. A tool holder comprising a head with a V shaped groove in its face and a clamping member, in combination with a tool and a re-setting device therefor comprising a free collar to be adjustably mounted on the tool and provided with a shoulder at one side adapted to bear against said holder and having a projection to bear on said head at the side of said groove.

2. In tool holding and re-setting devices, a tool having a suitable shank, in combination with a collar on said tool having a lateral projection on its inner side at the edge of the bore therein and a set screw fixing the collar upon the tool.

3. In tool holding and re-setting devices, a collar provided with a lateral projection 15 on its inner side and a set screw mounted thereon to clamp the collar in working position.

In testimony whereof I sign this specification in the presence of two witnesses.

ARTHUR T. MERRELL.

Witnesses:
R. B. MOSER,
C. A. SELL.